United States Patent
Li et al.

(10) Patent No.: US 6,704,299 B1
(45) Date of Patent: Mar. 9, 2004

(54) EFFICIENT FRAME QUALITY INDICATOR FOR A WIRELESS SIGNAL DECODER

(75) Inventors: Bin Li, Ottawa (CA); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/450,789

(22) Filed: Nov. 30, 1999

(51) Int. Cl.$^7$ .................................................. H04Q 7/00
(52) U.S. Cl. ........................ 370/332; 455/442; 714/819
(58) Field of Search ................................. 370/252, 331, 370/332; 375/340, 341, 343, 349, 150; 455/67.3, 442, 436; 714/819

(56) References Cited

U.S. PATENT DOCUMENTS

| | | | |
|---|---|---|---|
| 5,101,501 A | * 3/1992 | Gilhousen et al. | 455/442 |
| 5,675,344 A | * 10/1997 | Tong et al. | 342/457 |
| 5,790,596 A | 8/1998 | Sexton | 375/228 |
| 5,802,105 A | 9/1998 | Tiedemann, Jr. et al. | 375/225 |
| 6,088,590 A | * 7/2000 | Anderson et al. | 455/437 |
| 6,094,427 A | * 7/2000 | Yi | 370/331 |
| 6,175,590 B1 | * 1/2001 | Stein | 375/225 |
| 6,266,534 B1 | * 7/2001 | Raith et al. | 455/456.3 |
| 6,356,601 B1 | * 3/2002 | Chen et al. | 375/340 |
| 6,393,074 B1 | * 5/2002 | Mandyam et al. | 375/341 |

\* cited by examiner

Primary Examiner—Hassan Kizou
Assistant Examiner—Christopher M Swickhamer
(74) Attorney, Agent, or Firm—Max R. Wood; Ogilvy Renault (57) ABSTRACT

A method and apparatus for generating a frame quality indication of a frame of a received turbo encoded wireless signal is provided. A turbo decoder is used to decode a demodulated frame and provide a decoded frame. A turbo encoder is used to encode the decoded frame to provide a re-encoded frame. A modulator modulates the re-encoded frame. The frame quality is assessed based on a degree of correlation between the demodulated frame and the re-encoded modulated frame. The advantages include a less complex receiver due to reduced computational load, and potentially greater payload capacity in frames due to elimination of Yamamoto bits.

26 Claims, 3 Drawing Sheets

EFFICIENT FRAME QUALITY INDICATOR FOR A WIRELESS SIGNAL DECODER

CROSS-REFERENCE TO RELATED APPLICATIONS

This is the first application filed for the present invention.

MICROFICHE APPENDIX

Not applicable.

TECHNICAL FIELD

The invention relates to spread spectrum communications and in particular to methods and apparatus for providing frame quality indication in decoding received coded spread spectrum signals.

BACKGROUND OF THE INVENTION

Multiple access modulation techniques are some of the most efficient techniques for utilizing the limited wireless frequency spectrum. Examples of such techniques include time division multiple access (TDMA), frequency division multiple access (FDMA), and code division multiple access (CDMA).

CDMA modulation employs a spread spectrum technique for the transmission of information. A spread spectrum communications system uses a modulation technique that spreads a transmitted signal over a wide frequency band, this frequency band is substantially wider than the minimum bandwidth required to transmit the signal. The transmission signal is spread over the wide frequency band according to a spreading code associated with an intended receiver.

In a spread spectrum communications system, multiple spread spectrum signals are transmitted simultaneously in the same frequency band. A particular spread spectrum receiver determines which signal is intended for that particular receiver using a unique spreading code associated with the particular receiver. The spread spectrum signals in the frequency band not associated with the particular spreading code of the particular receiver appear as background noise to that receiver. The intended signal is to be discerned from the background noise.

Although spread spectrum transmission techniques provide excellent multiplexing transmission efficiencies compared to other signal transmission techniques, an induced signal degradation is experienced by a particular spread spectrum signal due to noise created by the other simultaneously transmitted spread spectrum signals. This is a limiting factor affecting the multiplexing efficiency of spread spectrum communications systems. This noise can be characterized as white noise and can be modeled using a Gaussian noise model referred to as additive white Gaussian noise (AWGN).

One of the major technical challenges in communicating effectively and reliably over wireless links is overcoming signal interference. There are may types of signal interference, each of which affects a spread spectrum signal differently. One type of interference affects the amplitude of the spread spectrum signal as it is received at a receiver. Another type of interference affects the phase of the spread spectrum signal as it is received at the receiver. Yet another type of interference affects the ability of the receiver to discern the signal from background noise such as thermal noise and other radio frequency pick-up. This last type of noise interference can be modeled as additive white Gaussian noise applied to the spread spectrum signal.

In general, noise, be it due to other spread spectrum signal transmissions in the frequency band or noise interference, reduces the signal-to-noise ratio (SNR) of a received spread spectrum signal. A reduced SNR makes it difficult to demodulate a particular spread spectrum signal intended for the receiver. This has a negative impact on multiplexing efficiency.

Considering that increasing multiplexing efficiency is a desired goal in spread spectrum communications, it is therefore of a competitive advantage to determine the reliability of wireless links employing spread spectrum communications techniques. Typically a transmitted signal employing spread spectrum techniques has a transmission structure: the payload is digital, and the stream of data conveyed between a spread spectrum transmitter and a spread spectrum receiver is divided into frames. The frames have an associated frame transmission rate and an associated frame transmission time. A frame quality indication is used to specify the reliability of reception of frames at the receiver.

Another spread spectrum communications area in which the reliability of a spread spectrum communications link is important, is the control of a soft handover of an established spread spectrum communications session. Typical mobile telephony implementations use mobile telephones with limited reception capabilities to exchange frames over a spread spectrum frequency bandwidth with a base station within a limited distance from the base station. Typically the distance is limited to one over which the amplitude of the spread spectrum signal diminishes to a value which makes the spread spectrum signal indistinguishable from background noise for the purposes of demodulation/decoding. Given this arrangement, such a spread spectrum communications session is said to take place within a cell. Therefore, as a mobile telephone nears a border of the cell, the mobile telephone experiences a degradation in the reception of the spread spectrum signal equivalent to a contamination by white noise. Consequently, determination of frame quality can also be used to initiate soft handover of spread spectrum communications sessions. Smooth soft handovers are essential to a mobile telephone end user's experience.

Techniques for assessing the reliability of wireless links employing spread spectrum transmission techniques have been proposed. These techniques address a variety of sources of interference and have yielded varied levels of success.

U.S. Pat. No. 5,802,105 which issued on Sep. 1, 1998 to Tiedemann, Jr. et al. describes a system which transmits a test sequence of digital data over a wireless communications channel established between a transmitter and a receiver. The accuracy of transmission over the wireless communications channel is determined by comparing the received test sequence to a replica test sequence generated at the receiver. While the teachings of Tiedemann, Jr. et al. have merit, in implementing these teachings a considerable fraction of a transmitted payload stream is dedicated to determining the accuracy of transmission. A considerable amount of computation is also required at the receiver to enable determination of the accuracy of transmission. Besides, the accuracy of the indicator is dependent on an overall accuracy of transmission.

U.S. Pat. No. 5,790,596 which issued Aug. 4, 1998 to Sexton describes a system which estimates a slowly changing channel parameter such as channel gain and phase shift to improve receiver performance for subsequent transmissions. Sexton teaches the use of frame quality indicating information transmitted as part of the transmission signal.

The frame quality indicating information is processed subsequent to demultiplexing the transmitted signal and used to selectively accept data frames. Rejected data frames are discarded. Sexton also teaches the use of an encoder block in the receiver to convolute and interleave a de-interleaved, de-convolved and demultiplexed accepted data frame to determine a degree of degradation of the transmitted signal with respect to channel gain or phase distortions. A portion of the re-encoded frame is compared with the received frame to compute the slowly changing channel parameter. The computed channel parameter is fed back to the receiver to improve reception of future transmissions on the theory that the channel parameter will remain substantially constant for a period of at least two received, accepted frames. While the teachings of Sexton have merit, frame acceptance is dependent solely on the transmitted frame quality indicator bits. This contributes to overhead and may result in the rejection of good frames. A considerable amount of computation is also required at the receiver in processing the frame quality indicating information in addition to computing the channel parameter.

Therefore there is a need for methods and apparatus for providing an efficient frame quality determination for a received spread spectrum signal subjected to noise induced distortions which does not rely on an overhead of sacrificial frame quality information in the transmitted data frames.

SUMMARY OF THE INVENTION

It is an object of the invention to provide a method of assessing the frame quality of a received wireless signal and improving multiplexing efficiency by eliminating a need for transmitting frame quality information along with the payload.

According to an aspect of the invention, a method of indicating the frame quality of a received frame of a received wireless signal is provided. The method comprises five steps. The received frame is demodulated using a demodulator and the demodulator provides a demodulated frame. The demodulated frame is decoded using a decoder and the decoder provides a decoded frame. After decoding, the decoded frame is encoded using an encoder matched to the decoder and the encoder provides a re-encoded frame. The re-encoded frame is modulated by a modulator matched to the demodulator and the modulator provides a re-modulated frame. The frame quality indication is computed based on a comparison between the received frame and the re-modulated frame.

According to another aspect of the invention, a receiver adapted to indicate the frame quality of a received frame of a received wireless signal is provided. The receiver comprises: a demodulator adapted to demodulate a received frame and provide a demodulated frame, a decoder adapted to decode the demodulated frame and provide a decoded frame, an encoder matched to the decoder, the encoder being adapted to encode the decoded frame and provide a re-encoded frame, a modulator matched to the demodulator, the modulator being adapted to modulate the re-encoded framed and provide a modulated signal, a correlator adapted to correlate the received frame with the re-modulated frame providing a correlation level and a decision circuit adapted to compute the frame quality indication of the received frame based on the correlation level.

According to another aspect of the invention, a frame quality indication generator is provided. The frame quality indication generator is adapted to process a received frame of an encoded wireless signal and a decoded frame resulting from the encoded wireless signal being demodulated by a demodulator and decoded by a decoder. The frame quality indication generator comprises: an encoder matched to the decoder, the encoder being adapted to encode the decoded frame and provide a re-encoded frame, a modulator matched to the demodulator, the modulator being adapted to modulate the re-encoded frame and provide a re-modulated frame, a correlator adapted to correlate the received frame with the re-modulated frame and provide a correlation level, and a decision circuit adapted to compute the frame quality indication of the received frame based on the correlation level.

According to another aspect of the invention, a method of initiating soft handover of a wireless communication session between base stations is provided. The method uses a frame quality indication to selectively initiate a soft handover.

According to another aspect of the invention, a method of decoding a received wireless signal is provided. The method uses a frame quality indication to selectively accept decoded frames.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
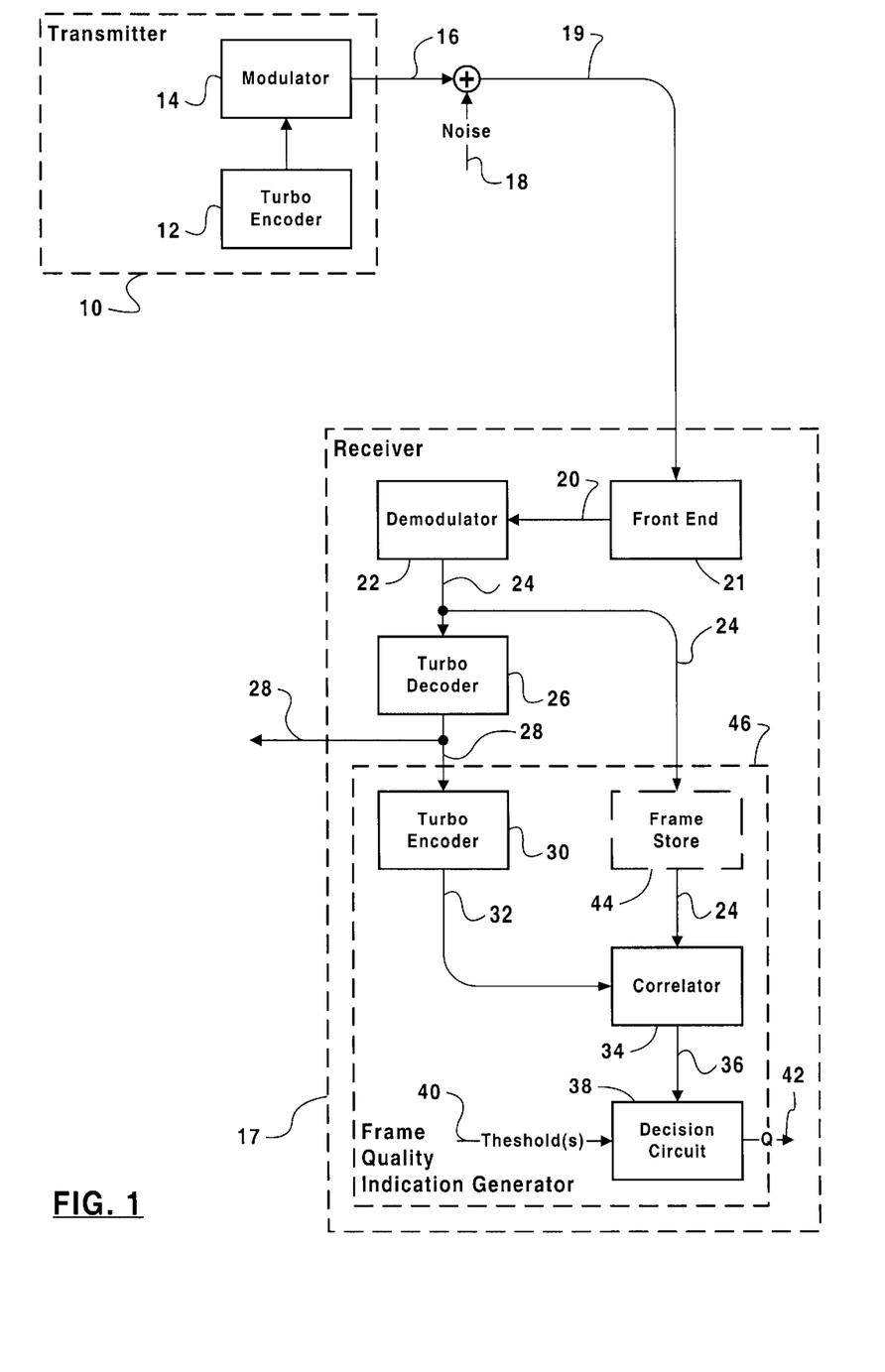
FIG. 1 is a schematic diagram showing components of a wireless communication system and a process in accordance with the invention by which a frame quality indication is provided.

In accordance with a preferred embodiment of the invention, components and a process providing an efficient frame quality indication are shown in FIG. 1. The frame quality is assessed based on demodulated frames.

A transmitter 10 having a turbo encoder 12 and a spread spectrum signal modulator 14, provides a turbo encoded spread spectrum transmitted signal 16. As the transmitted signal 16 propagates towards a receiver 17, the transmitted signal 16 is subject to degradation due to interference which may be represented as white noise indicated by reference numeral 18. Typically the white noise 18 combines with the transmitted signal 16 in an additive manner. A received spread spectrum signal 19 is picked-up by the receiver 17 using an antenna (not shown).

The received spread spectrum signal 19 is divided up into constituent received frames 20 by front-end processing 21. A received frame 20 is demodulated according to methods known in the art by employing a demodulator 22. Demodulator 22 is adapted to provide a demodulated frame 24. The demodulated frame 24 is decoded by a turbo decoder 26 according to methods known in the art. The turbo decoder 26 is adapted to output a decoded frame 28.

According to the invention, a copy of the decoded frame 28 is encoded by a turbo encoder 30 according to methods known in the art. The turbo encoder 30 is matched to the turbo decoder 26 of the receiver 17. The turbo encoder 30 is adapted to provide a re-encoded frame 32. A correlator 34 is used to correlate the demodulated frame 24 with the re-encoded frame 32. An example of a method of correlating frames will be described below in detail. The correlator 34 is adapted to provide a correlation level 36.

As described above, the correlator 34 correlates the demodulated frame 24 with the re-encoded frame 32. Processing time is required to decode the demodulated frame 24 into the decoded frame 28 and also to encode the decoded frame into the re-encoded frame 32. In accordance with one implementation of the invention, the frame reception rate and frame transmission time can be such that the demodulator 22 still provides a copy of the demodulated frame 24 at its output, stored, for example, in a register or the like, for correlation purposes at the time the re-encoded frame 32 is provided. In accordance with another implementation of the invention, a copy of the demodulated frame 24 is stored in an intermediary frame store 44. The preferred frame store 44 would permit an increased throughput at the cost of an increased component count.

Figure 2:
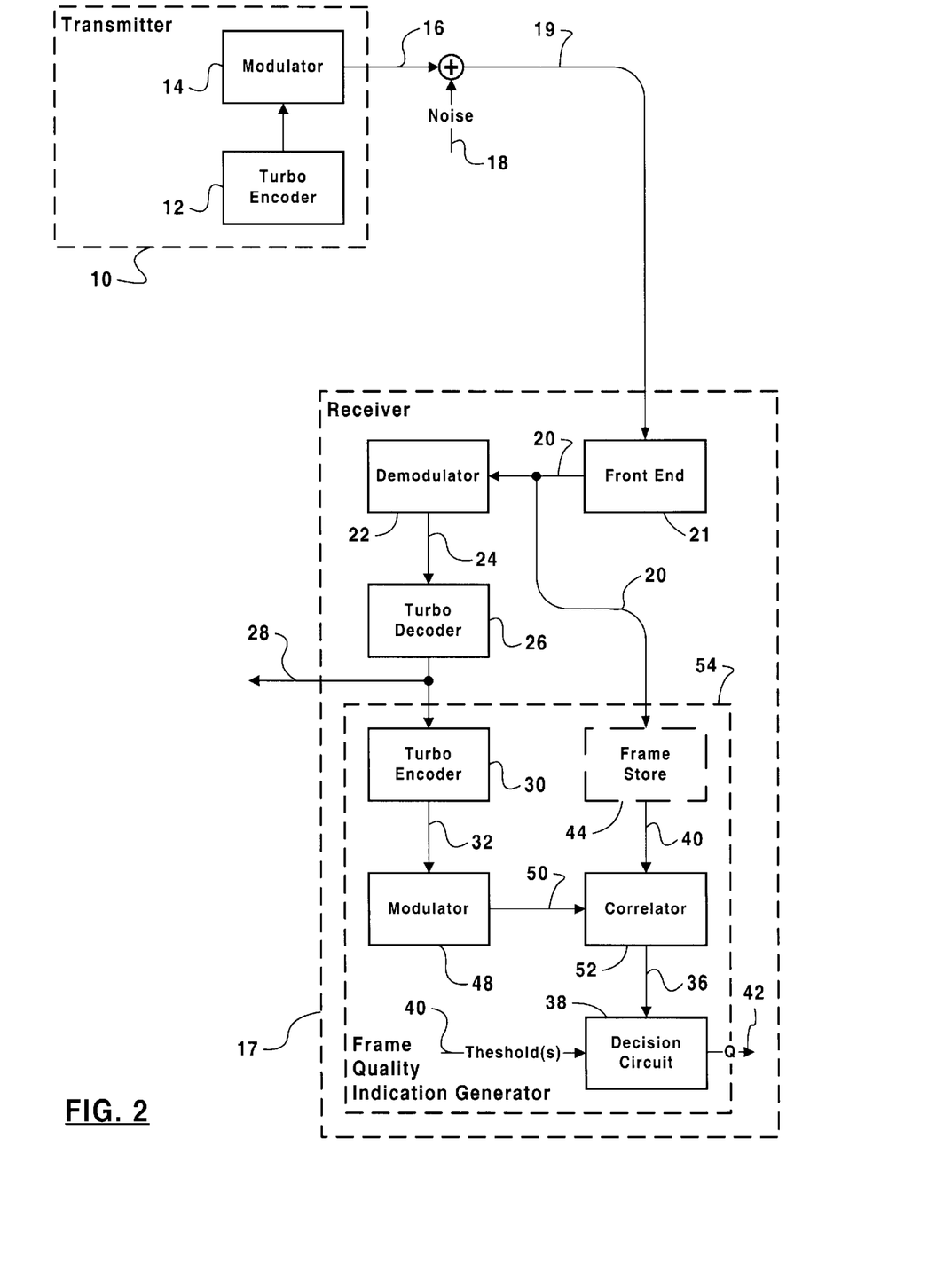
FIG. 2 is a schematic diagram showing components of another wireless communication system and process in accordance with the invention by which a frame quantity indication is provided.

In accordance with another embodiment of the invention, components and another process providing an efficient frame quality indication are show in FIG. 2. In this implementation the same spread spectrum transmitter 10 is used. The frame quality is assessed based on a correlation between modulated frames. Consequently, the re-encoded frame 32 is processed by a modulator 48 which is matched to demodulator 22. The modulator 48 is adapted to provide a re-modulated frame 50.

A decision circuit 38 common to both of the above-described embodiments, and having at least one register (not shown) to store at least one threshold 40 is adapted to compare the correlation level 36 against the at least one threshold 40. The decision circuit 38 is further adapted to provide a frame quality indication 42 of the demodulated frame 24.

Although the embodiments of the invention shown in FIGS. 1 and 2 use turbo coding techniques, the invention can be implemented using other coding techniques, such as Viterbi-convolutional coding techniques. For such an embodiment, multiplexing efficiency can be increased by eliminating the transmission of Yamamoto bits traditionally used to provide frame quality indication.

The modulated frame 50 and a copy of the received frame 20 are correlated by a correlator 52. The correlator 52 is adapted to provide the correlation level 36. The frame store 44 may be used to retrievably store a copy of each received frame 20 for correlation purposes. A decision circuit 38 common to both of the above embodiments has at least one register (not shown) for storing at least one threshold 40. The decision circuit is adapted to compare the correlation level 36 against the at least one threshold 40, and to provide a frame quality indication 42 related to the demodulated frame 24.

Figure 3:
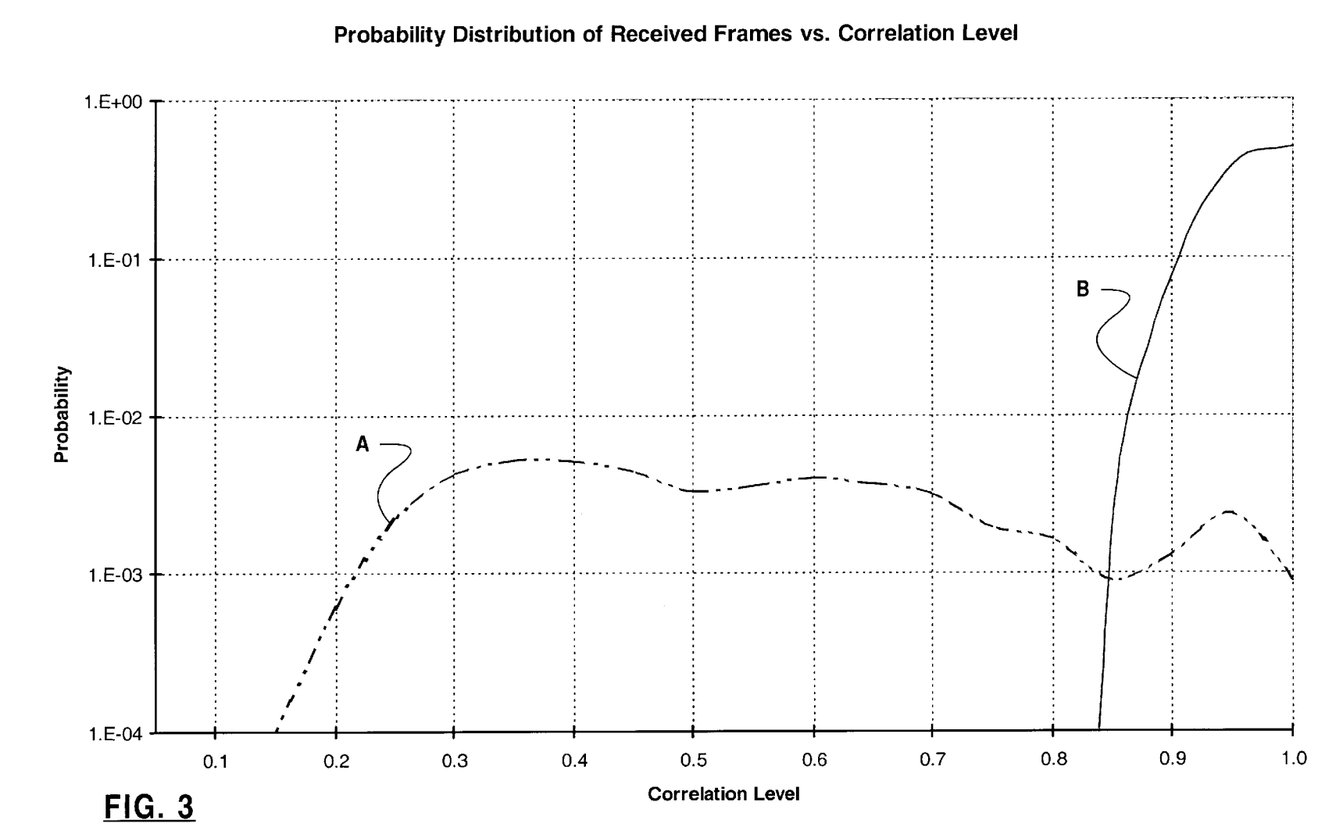
FIG. 3 is an exemplary graph showing the characteristics of a typical received turbo encoded spread spectrum signal conveying data and transmission error rejection characteristics afforded by the invention.

Although the embodiment of the invention illustrated in FIG. 3 uses turbo coding techniques, that embodiment can also be implemented using other coding techniques, such as Viterbi-convolutional coding. As noted above, multiplexing efficiency may be increased by eliminating the transmission of Yamamoto bits traditionally used to provide a frame quality indication.

The frame quality indication generator 46 shown in FIG. 1 may be provided as an after-market add-on for a spread spectrum receiver that uses turbo coding techniques. The add-on equipment includes the turbo encoder 30, the correlator 34, the decision circuit 38, and optionally the frame store 44. The frame quality indication generator 54 shown in FIG. 2 may likewise be provided as after-market add-on equipment for a spread spectrum receiver that uses turbo coding techniques. The frame quality indication generator 54 includes the turbo encoder 30, modulator 48, correlator 52, the decision circuit 38, and optionally the frame store 44.

As will be explained below, the decision circuit 38 may use two thresholds to provide a hard frame quality indication 42. If two thresholds are used, a first threshold level is greater than a second threshold level and: if the correlation level is greater or equal to the first threshold level, the frame quality is considered "acceptable"; if the correlation level is less than the first threshold level but greater or equal to the second threshold level, the frame quality is considered "indeterminent"; and, if the correlation level is less than the second threshold level, the frame quality is considered "unacceptable". In practice, frames are rejected unless the correlation level is greater than the first threshold level. Otherwise, the frames are rejected. The two lower levels are used to control soft handover of a spread spectrum communications session, as will be explained below in more detail.

The decision circuit 38 may also use only one threshold 40 to provide a hard frame quality indication 42. The threshold 40 is a level against which the correlation level 36 is compared. If the correlation level 36 is greater or equal to the threshold level 40, the frame quality is considered "acceptable". If the correlation level 36 is less than the threshold level 40, the frame quality is considered "unacceptable". Frames are accepted if the frame quality indication is greater than the threshold and rejected if it is less than the threshold. Data transport over a wireless link employing spread spectrum techniques can use this implementation of the invention to selectively accept decoded data frames 28 processed by a receiver 17 of a mobile receiver.

The apparatus and methods described above can also be used to initiate a soft handover of a spread spectrum communications session between base stations as a mobile receiver 17 moves towards and across a boundary between two cells. The frame quality indication 42 provided with a first and a second threshold may be used to initiate and perform a soft handover of a spread spectrum communications session for the mobile receiver 17 crossing a boundary between two cells. If the correlation level 36 is greater or equal to the first threshold level, then soft handover is suppressed. If the correlation level 36 is less than the first threshold level but greater or equal to the second threshold level, then soft handover is initiated. If the correlation level 36 is less than the second threshold level, then soft handover is performed.

The frame quality indication 42 provided by one threshold level 38 may also be used to provide an initiation of a soft handover of a spread spectrum communications session for a mobile receiver 17 crossing a boundary between two cells. In this case, if the correlation level 36 is greater than or equal to the threshold level 40, a soft handover is suppressed. If the correlation level 36 is less than the threshold level 40, then soft handover is initiated and performed.

Although the above-described embodiments use one or two threshold levels, there is no limitation on the degree of specificity of the frame quality indication. More thresholds may be used to provide a continuous range of specificity for a soft frame quality indication.

FIG. 3 is a graph showing characteristics of a typical received turbo encoded spread spectrum signal conveying data, and a transmission error rejection window afforded by the invention. In this example 1000 frames of 256 bits were transmitted between a spread spectrum transmitter and a spread spectrum receiver. Turbo coding was used. Frame quality indication was provided according to the invention for the purposes of conveying data over a spread spectrum communications link.

Each of the received constituent demodulated bits transmitted in each frame can be represented by received samples $\{r_k = t_k + n_k, 1 \leq k \leq N\}$, where $\{t_k, 1 \leq k \leq N\}$ represents the transmitted bits and $\{n_k, 1 \leq k \leq N\}$ represents the additive noise. The noise variance $\sigma_n^2$, for the purposes of this example, can be set to 1 without loss of generality. Each of the constituent estimated re-encoded bits can be represented by samples $\{s_k, 1 \leq k \leq N\}$. One, of the most commonly used modulations for turbo coding applications is binary phase shift keying (BPSK). For BPSK, the correlation output is set to $$\sum_{k=1}^{N} r_k s_k.$$

This value is normalized as follows:

$$\gamma = \frac{\left|\sum_{k=1}^{N} r_k s_k\right|}{\left|\sum_{k=1}^{N} t_k^2\right|} = \frac{1}{\lambda}\left|\sum_{k=1}^{N} r_k s_k\right|,$$

where $$\lambda = \sum_{k=1}^{N} t_k^2$$

is constant for BPSK modulation. Therefore $\{\gamma, 0 \leq \gamma \leq 1\}$ represents a normalized correlation level.

The results shown in FIG. 3 relate to a simulation test using a turbo coding technique. Two symmetrical parallel concatenated convolutional coders were employed. The encoders each used a generator polynomial expressed as $G=[1(1+D+D^3)/1+D^2+D^3]$. A coding rate of $$R = \frac{1}{3}$$

was used with a random interleaver. As is well known, interleavers are used to guard against bursty interference. At a signal-to-noise ratio (SNR)

$$\frac{E_b}{N_0} = 1 \text{ dB},$$

the achievable bit error rate was BER=$3.4 \times 10^{-4}$ and the frame error rate was about $4.8 \times 10^{-2}$.

FIG. 3 shows two correlation curves A and B. Curve A represents received frames that did not correspond to the transmitted frame content, and curve B represents received frames that correctly corresponded to the transmitted frame content. Curves A and B were generated by comparing the transmitted frame content to the decoded frame content. The simulation mimicked a real environment typical of the intended operating environment for the spread spectrum communications system described above. Curve A represents a variation of the probability of transmitting an erroneous frame corresponding to a correlation level computed as described above. Curve B represents a variation of the probability of transmitting a correct frame corresponding to a correlation level as described above. The graph shows a fuzzy type result. It is apparent that if a threshold of about 0.83 is used, 100% of the frames received with a normalized correlation level less than this threshold are erroneous. It is also apparent that 100% of the correct frames have a normalized correlation level above this threshold. A small fraction of erroneous frames also have a normalized correlation level above this threshold.

The result is that all correct frames can be accepted by employing the teachings of this invention using one hard threshold. A large fraction of erroneous frames are rejected and only a small fraction of erroneous frames are accepted. Typically the ratio of rejected to accepted erroneous frames was found to be 9:1. These results can be improved if a complex white Gaussian noise model is used to characterize noise present during demodulation and decoding of a particular spread spectrum signal induced by other simultaneously transmitted spread spectrum signals, background noise and signal loss due to signal dissipation over a distance between the transmitter and the receiver.

Although the invention has been described with reference to spread spectrum signals and turbo encoders, it will be understood by those skilled in the art that the invention may be applied to any wireless telecommunication that uses frames to transmit data.

The embodiments of the invention described above are intended to be exemplary only. The scope of the invention is therefore intended to be limited solely by the scope of the appended claims.

We claim:

1. A method of providing a frame quality indication for a received frame of a received, encoded wireless signal, the method comprising steps of:
   a) demodulating the received frame;
   b) decoding the demodulated frame using a decoder, the decoder being adapted to output a decoded frame;
   c) encoding the decoded frame using an encoder matched to the decoder, the encoder being adapted to output a re-encoded frame;
   d) modulating the re-coded frame to provide a re-modulated frame; and
   e) providing the frame quality indication used to specify the reliability of the reception of the received frame based on a comparison between the received frame and the re-modulated frame.

2. A method as claimed in claim 1, wherein the encoded wireless signal is encoded using turbo coding techniques.

3. A method as claimed in claim 1, wherein the encoded wireless signal is encoded using Viterbi-convolutional coding techniques.

4. A method as claimed in claim 1, wherein a copy of the received frame is stored in a frame store pending correlation with the re-modulated frame.

5. A method as claimed in claim 1, wherein the comparison fixer comprises the step of:
   a) correlating the received frame with the re-modulated frame and computing a correlation level.

6. A method as claimed in claim 5, wherein the step of providing the frame quality indication fixer comprises the step of:
   a) comparing the correlation level against a threshold level, and:
      i) accepting the frame if the frame quality indication is greater than or equal to the threshold level, and ii) rejecting the frame if the correlation level is lower than the threshold level.

7. A method as claimed in claim 5, wherein the step of providing the frame quality indication further comprises the step of:
   a) comparing the correlation level against a first and second threshold level, the first threshold level being greater than the second threshold level, and:
      i) accepting the frame if the correlation level is greater than or equal to the first threshold level,
      ii) rejecting the frame if the correlation level is less than the first threshold level and greater or equal to the second threshold level, and
      iii) rejecting the frame if the correlation level is lower than the second threshold level.

8. A method of enabling soft handover of a wireless communication session between base stations, the method comprising the steps of:
   a) decoding a demodulated frame provided by demodulation of a modulated frame of a received encoded wireless signal using a decoder, the decoder being adapted to output a decoded frame;
   b) encoding the decoded frame using an encoder matched to the decoder, the encoder being adapted to output a re-encoded frame;
   c) modulating the re-encoded frame to provide a re-modulated frame; and
   d) selectively initiating a soft handover based on a frame quality indication used to specify a reliability of the reception of the received frame by determining a correlation level resulting from a correlation between the modulated frame and the re-modulated frame.

9. A method as claimed in claim 8, wherein a copy of the modulated frame is stored in a frame store pending correlation between the modulated frame and the re-modulated frame.

10. A method as claimed in claim 8, wherein the step of selectively initiating the soft handover further comprises the step of:
    a) comparing the correlation level against a first and second threshold levels, the first threshold level being greater than the second threshold level:
       i) suppressing soft handover if the correlation level is greater than or equal to the first threshold level,
       ii) initiating the soft handover if the correlation level is lower than the first threshold level and greater or equal to the second threshold level, and
       iii) performing the soft handover if the correlation level is lower than the second threshold level.

11. A method as claimed in claim 8, wherein the step of selectively initiating the soft handover further comprises the step of:
    a) comparing the correlation level against a threshold level, and:
       i) suppressing soft handover if the correlation level is greater than or equal to the threshold level, and
       ii) initiating the soft handover and performing the soft handoff if the correlation level is less than the threshold level.

12. A method of decoding a frame of a received encoded wireless signal, the method comprising steps of:
    a) demodulating the frame of the received signal to provide a demodulated frame;
    b) decoding the demodulated frame using a decoder, the decoder being adapted to output a decoded frame;
    c) encoding the decoded frame using an encoder matched to the decoder, the encoder being adapted to output a re-encoded frame;
    d) modulating the re-encoded frame to provide a re-modulated frame; and
    e) selectively accepting the decoded frame based on a frame quality indication used to specify the reliability of the received frame by determining a correlation level resulting from a correlation between the frame of the received signal and the re-modulated frame.

13. A method as claimed in claim 12, wherein the frame of the received signal is stored in a frame store pending correlation between the frame of the received signal and the re-modulated frame.

14. A method as claimed in claim 12, wherein the step of selectively discarding the decoded frame further comprises the step of:
    a) comparing the correlation level against a threshold level, and:
       i) accepting the decoded frame if the correlation level is greater than or equal to the threshold level, and
       ii) discarding the decoded frame if the correlation level is less than the threshold level.

15. A receiver adapted to assess a frame quality indication of a modulated received frame of a received wireless signal, the receiver comprising:
    a) a demodulator for demodulating the modulated receive frame to provide a demodulated received frame;
    b) a decoder adapted to decode the demodulated received frame, the decoder outputting a decoded received frame;
    c) an encoder matched to the decoder, the encoder being adapted to encode the decoded received frame, the encoder being further adapted to output a re-encoded frame;
    d) a modulator for modulating the re-encoded frame to output a re-modulated frame;
    e) a correlator adapted to correlate the modulated received frame with the re-modulated frame, the correlator being further adapted to output a correlation level; and
    f) a decision circuit adapted to assess the frame quality indication used to specify the reliability of the demodulated received frame based on the correlation level.

16. A receiver as claimed in claim 15, wherein the receiver is a turbo coding receiver.

17. A receiver as claimed in claim 15, wherein the receiver is a Viterbi-convolutional coding receiver.

18. A receiver as claimed in claim 15, wherein the receiver further comprises:
    a) a frame store adapted to retrievably store a copy of the demodulated frame for correlation with the re-modulated frame.

19. A receiver as claimed in claim 15, wherein the decision circuit further comprises:
    a) a register adapted to hold a threshold level, whereby the fire is accepted if the correlation level is greater than or equal to the threshold level, and otherwise the frame is rejected.

20. A receiver as claimed in claim 15, wherein the decision circuit further comprises:
    a) two registers adapted to hold a first threshold level and a second threshold level, respectively, the first threshold level being greater than the second threshold level, whereby the frame is accepted if the correlation level is greater than or equal to the first threshold level, and otherwise the frame is rejected.

21. A frame quality indication generator adapted to receive a modulated received frame of an encoded wireless signal and further adapted to receive a demodulated, decoded frame output by a decoder, the frame quality indication generator comprising:

a) an encoder matched to the decoder, the encoder being adapted to encode the demodulated, decoded frame and output a re-encoded frame;

b) a modulator adapted to modulate the re-encoded frame and output a re-modulated frame;

c) a correlator adapted to correlate the modulated received frame with the re-modulated frame and output a correlation level; and d) a decision circuit adapted to assess the frame quality indication used to specify a reliability of the modulated received frame based on the correlation level.

22. A frame quality indication generator as claimed in claim 21, wherein the frame quality indication generator is a frame quality indication generator for a turbo coding receiver.

23. A frame quality indication generator as claimed in claim 21, wherein the frame quality indication generator is a frame quality indication generator for a Viterbi-convolutional coding receiver.

24. A frame quality indication generator as claimed in claim 21, wherein the frame quality indication generator further comprises a frame store adapted to retrievably store a copy of the modulated frame signal pending correlation with the re-modulated frame.

25. A frame quality indication generator as claimed in claim 21, wherein the decision circuit further comprises:

a) a register adapted to store a threshold level, whereby the frame is accepted if the correlation level is greater than or equal to the threshold level, and otherwise the frame is rejected.

26. A frame quality indication generator as claimed in claim 21, wherein the decision circuit further comprises:

a) two registers adapted to store a first threshold level and a second threshold level, respectively, the first threshold level being greater than the second threshold level, whereby the frame is accepted if the correlation level is greater than or equal to the first threshold level, and otherwise the frame is rejected.

* * * * *

UNITED STATES PATENT AND TRADEMARK OFFICE
CERTIFICATE OF CORRECTION

PATENT NO. : 6,704,299 B1
DATED : March 9, 2004
INVENTOR(S) : Ben Li and Wen Tong It is certified that error appears in the above-identified patent and that said Letters Patent is hereby corrected as shown below:

Column 10,
Line 25, "a demodulator for demodulating the modulated receive frame…" is corrected to read -- a demodulator for demodulating the modulated received frame --.
Line 54, "a register adapted to hold a threshold level, whereby the fire is accepted…" is corrected to read -- a register adapted to hold a threshold level, whereby the frame is accepted… --.

Signed and Sealed this

Seventh Day of March, 2006

JON W. DUDAS
*Director of the United States Patent and Trademark Office*